Oct. 28, 1969 H. O. BURTON ET AL 3,475,723

ERROR CONTROL SYSTEM

Filed May 7, 1965 5 Sheets-Sheet 1

INVENTORS H. O. BURTON
R. N. WATTS

BY Lucian C. Canepa

ATTORNEY

Oct. 28, 1969 H. O. BURTON ET AL 3,475,723

ERROR CONTROL SYSTEM

Filed May 7, 1965 5 Sheets-Sheet 2

Oct. 28, 1969 H. O. BURTON ET AL 3,475,723

ERROR CONTROL SYSTEM

Filed May 7, 1965 5 Sheets-Sheet 4

United States Patent Office 3,475,723

Patented Oct. 28, 1969

3,475,723
ERROR CONTROL SYSTEM

Herbert O. Burton, Little Silver, and Robert N. Watts, Westfield, N.J., assignors to Bell Telephone Laboratories, Incorporated, New York, N.Y., a corporation of New York Filed May 7, 1965, Ser. No. 454,016
Int. Cl. G06f *11/00*
U.S. Cl. 340—146.1 18 Claims

ABSTRACT OF THE DISCLOSURE

Signaling in an error control system is accomplished by selectively modifying the parity check digit section of an information sequence that is encoded in accordance with an error detecting code, thereby to form a non-code signaling sequence that exhibits good distance properties with respect to all sequences of the code.

This invention relates to digital error control systems and more particularly to the provision of reliable signaling techniques in such systems.

High accuracy in the transmission of digital information signals over a noisy channel can be achieved when the signals are encoded in accordance with an error-detecting code. Correction of erroneously-received signals can then be accomplished by a repeat transmission of the portion of the signals containing the errors. These so-called feedback techniques have been shown to be very effective in controlling errors.

For some sources of information signals it is inconvenient or impossible to have the source wait while previously-sent signals are being retransmitted. Also, there are cases where it is required that the received signals be applied to a utilization circuit at a uniform rate. An article by F. E. Froehlich and R. R. Anderson entitled "Data Transmission over a Self-Contained Error Detection and Retransmission Channel," which appears at pages 375–398 of the January 1964 issue (Part 2) of the Bell System Technical Journal, describes a continuous information transmission system in which signals are accepted from a source and delivered to a utilization circuit at a steady rate. The described system provides enough storage of information to permit the detection of errors and their correction by retransmission without the source and utilization circuit being aware that these processes are going on. The source merely puts information signals into the transmission system at its own rate and the utilization circuit accepts highly reliable information signals from the system at the same rate.

For effective operation an error detection and retransmission system of the type described in the Froehlich-Anderson article must include circuitry for sending control signals between the transmitting and receiving terminals thereof. These control signals are needed, for example, to signal the receiving terminal that a retransmission of information signal sequences is to follow, or to signal the receiver that the termination of a group of information sequences to be transmitted has occurred.

An object of the present invention is the improvement of digital error control systems.

More specifically, an object of this invention is an improved error detection and retransmission system having unique and reliable signaling capabilities.

Another object of the present invention is an error detection and retransmission system that utilizes digital control signals which are sent over the same transmitter-to-receiver forward channel as that used for information signal transmission.

Another object of this invention is an error detection and retransmission system in which the control signals employed therein are not members of the code set available to represent information signal sequences but are nevertheless characterized by good distance properties with respect to the information sequences.

Still another object of the present invention is a reliable and efficient error detection and retransmission system which is characterized by simplicity of design.

These and other objects of the present invention are realized in a specific illustrative system embodiment thereof which includes transmitting and receiving terminals interconnected by a forward channel over which information and parity check signals are sent. The terminals are also interconnected by a reverse channel over which retransmission request signals are sent to the transmitter from the receiver.

The reverse channel is not error-free. However, a fail-safe method is used thereon for reverse signaling purposes, so that almost all errors on the reverse channel result in unnecessary retransmissions rather than a failure to retransmit. Such retransmission, whether it results from a retransmission request from the receiving terminal or from an error on the reverse channel, is preceded by a so-called re-run indication signal. This signal alerts the receiver to the fact that a retransmission is to follow and, in addition, serves as the basis for a determination by the receiver as to whether the retransmission resulted from a bona fide or false request. In turn, the mode of operation of the receiver is controlled as a result of this determination.

The re-run indication signal sent over the forward channel before each retransmission, is formed by selective modification of the parity check digit section of an encoded information signal sequence. In particular, the parity section of an information sequence is altered by modulo 2 addition thereto of a modifier word. The resulting modified sequence is not a member of the code set from which encoded sequences are selected. The modified sequence is, however, characterized by good distance properties with respect to all members of the code set.

In the receiving terminal a set of parity check digits are recalculated from the received information digits of the modified sequence. These recalculated parity digits are then compared (by modulo 2 addition) with the received parity digits. Circuitry in the receiver detects whether or not the result of this comparison operation is the noted modifier word. If it is, the receiver is thereby signaled that a retransmission is to follow.

If the receiver had detected an error just prior to receipt of a re-run indication signal, the retransmission to follow is interpreted to be a bona fide one in response to an actual retransmission request signal. On the other hand, if the receiver had not just previously detected an error, the retransmission to follow is identified by the receiver as a false one, probably stemming from an error occurrence on the reverse channel. In either case, the mode of operation of the receiving equipment is accordingly controlled to process the retransmitted information sequences in an appropriate manner.

Also, if the re-run indication signal is itself affected by channel noise, the receiving terminal will in most cases interpret this occurrence as an error in the received sequence and will request a retransmission. This process will continue, with the transmitting terminal preceding each retransmission with a re-run indication signal, until the receiving terminal recognizes that the sequence for which the original retransmission was requested contains a re-run indication signal, at which time the received signals will be processed as described in the immediately preceding two paragraphs. If the sequence containing the re-run indication signal is converted by noise into a valid code sequence, then undetected errors will occur. However, because of the favorable distance properties of the re-run signal relative to the code sequences, this will as a practical matter occur very infrequently.

Additionally, the illustrative system includes circuitry in the transmitter for generating a so-called end-of-transmission signal. This signal is generated in response to an indication from the information source that there are no more information sequences to be delivered for encoding and transmission. The end-of-transmission signal is also formed by selective modification of the parity check digit section of an encoded information signal sequence to form a non-code word. Detection of the non-code word by the receiver is carried out in a manner similar to that described above for the re-run indication signal.

It is a feature of the present invention that a digital system include circuitry responsive to a retransmission request signal or a source control signal for selectively modifying the parity check digit section of an information sequence that is encoded in accordance with an error detecting code, thereby to form a non-code sequence which exhibits good distance properties with respect to all sequences of the code.

It is another feature of this invention that an error control system include circuitry in the receiving terminal thereof for determining whether or not a received encoded sequence constitutes a non-code signaling element.

A complete understanding of the present invention and of the above and other objects, features and advantages thereof may be gained from a consideration of the following detailed description of a specific illustrative embodiment thereof presented hereinbelow in connection with the accompanying drawing, in which.

Figure 1:
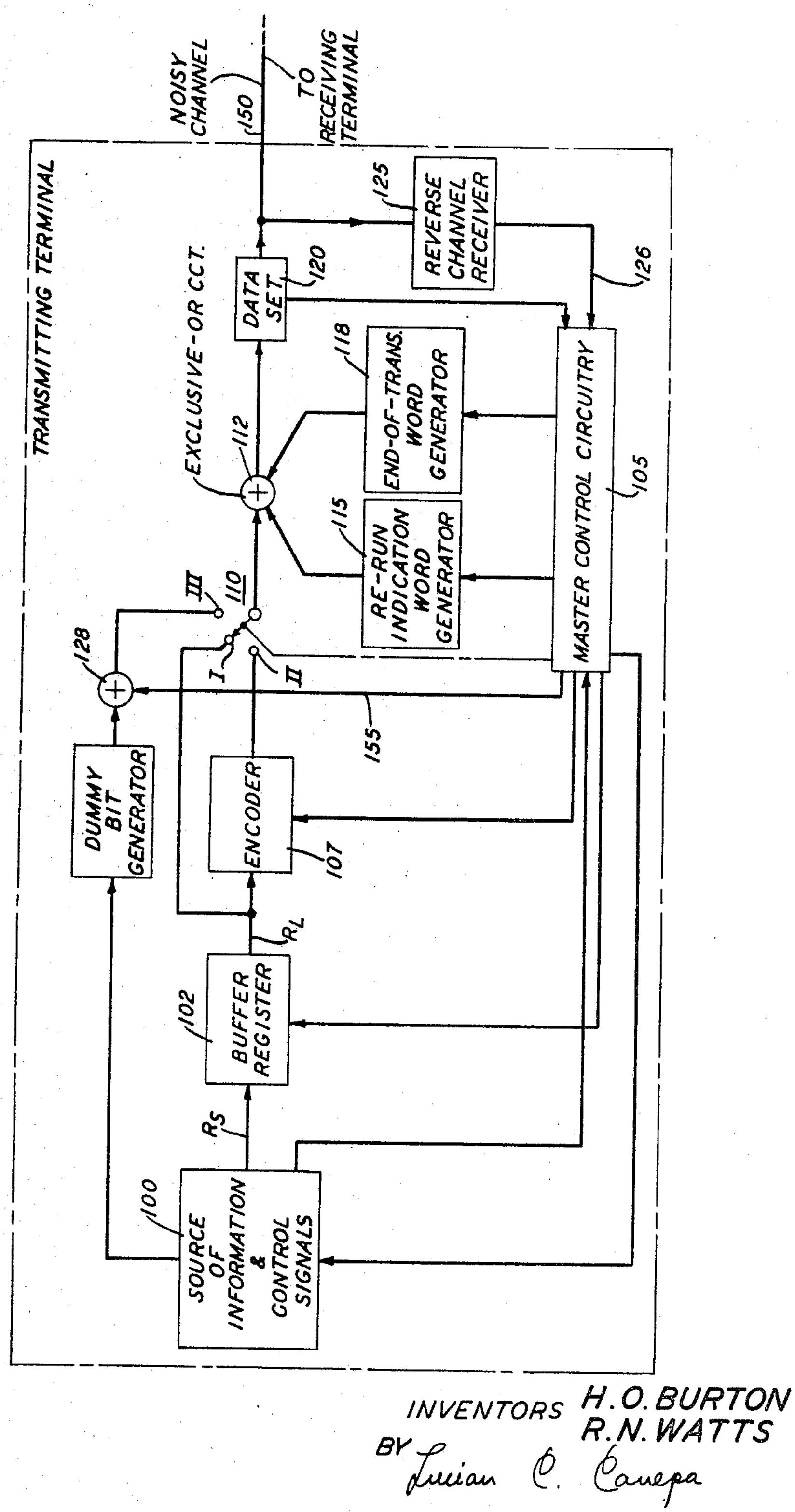
FIGS. 1 and 2 show, respectively, transmitting and receiving terminals which together comprise a specific illustrative error control system made in accordance with the principles of the present invention.

The illustrative transmitting terminal shown in FIG. 1 includes a source 100 for supplying binary information signals, each *k*-digit sequence of which comprises an information word. The source 100 is assumed to be capable of generating $2^k$ different *k*-digit binary sequences. Herein, for illustrative purposes *k* will be assumed to be 4. Hence, the source 100 will be considered to be capable of generating $2^4$ or 16 different 4-digit binary sequences.

The source 100 also supplies control signals. In particular, the source 100 supplies to the transmitting terminal so-called request-to-send and end-of-information control signals. A request-to-send signal is generated by the source 100 before it supplies to the terminal a particular group of information sequences. In turn, the source 100 supplies an end-of-information signal after supplying to the terminal all the information sequences of a particular group to be transmitted.

Each *k*-digit information sequence supplied by the source 100 is applied at a constant rate of $R_S$ bits per second to a buffer register 102 which is controlled by signals applied thereto from master control circuitry 105. Each information sequence applied to the register 102 is retained therein for a predetermined period of time for possible retransmission. (For illustrative purposes $R_S$ may be assumed herein to be 600 bits per second.)

The output of the buffer register 102 is applied to an encoder 107 at a rate of $R_L$ bits per second, which for illustrative purposes may be assumed to be 2400 bits per second. In the encoder an *n*–*k* digit parity check sequence is derived from the *k* information digits applied thereto. Advantageously, this derivation is carried out in general accordance with one of the well-known Bose-Chaudhuri-Hocquenghem (BCH) codes. Such codes are described in "Error Correcting Codes," by W. W. Peterson, at pages 162–181, The M.I.T. Press and John Wiley and Sons, 1961, and constitute one particularly efficient manner in which digital information sequenced to be transmitted may be encoded to possess significant error-detecting capabilities. The equipment for performing a BCH encoding operation is well known in the art, being described, for example, on pages 107–135 of the cited Peterson text.

One particular well-known BCH block code includes seven information digits and eight appended parity check digits. In practice this (15, 7) code can be shortened or truncated by the elimination of three information digits therefrom. The resulting (12, 4) code, which comprises four information digits and eight parity check digits, is the illustrative code which will be considered herein to be embodied in the system represented in FIGS. 1 and 2. In other words, the encoder 107 of FIG. 1 responds to each 4-digit information sequence applied thereto by generating an 8-digit parity check sequence.

The (12, 4) code noted above is characterized by a minimum distance of 5, so that any error pattern with 4 or fewer errors will be detected. In addition, all error bursts of length 8 or less, $127/128\times100\%$ of all bursts of length 9, and $255/256\times100\%$ of all bursts of length 10, 11 or 12 are detectable. (A burst of length K is a sequence of *k* digits with the first and last digits in error. The intervening *k*–2 digits may or may not be in error.)

The information signals supplied by the buffer register 102 shown in FIG. 1 are also applied to contact I of a switch 110 whose operation is controlled by the circuitry 105. Thus, the *k* digits of each information sequence are applied from the register 102 via the switch 110 to an EXCLUSIVE-OR circuit 112. During normal error-free operation of the transmitting terminal the signals applied to the circuit 112 from the switch 110 are not modified in any way by signals applied to the circuit 112 from a re-run indication word generator 115 and an end-of-transmission word generator 118. Accordingly, the information signals are applied via the circuit 112 in unmodified form to a data set 120.

At the end of each *k*-digit information sequence, the movable arm of the switch 110 is controlled by the circuitry 105 to engage contact II, whereby an *n*–*k* digit parity check sequence derived from the corresponding information sequence is also applied via the circuit 112 to the data set 120. Subsequently the arm of the switch 110 is moved to contact III, so that *m* so-called dummy bits are applied to the data set 120 via the circuit 112. In the particular illustrative case considered herein, *m* will be assumed to equal 4. The nature and purpose of the dummy or fill-in bits will be described in detail hereinbelow.

Thus, the redundant sequence normally applied to the data set 120 comprises four information bits, eight parity check bits and four dummy bits, typically in that order. The set 120 modulates the signals applied thereto and then couples them to a noisy channel 150 which is prone to introducing errors into the signal sequences propagated therealong. Additionally, the set 120 supplies regularly-occurring timing signals to the circuitry 105 which, as noted above, controls the operation of the register 102 and the switch 110. Also, the circuitry 105 supplies the necessary timing and control signals to the source 100, the encoder 107, the word generators 115 and 118 and an EXCLUSIVE-OR circuit 128.

Advantageously, the data set 120 shown in FIG. 1 may be of the type described in "Phase Modulation Data Sets for Serial Transmission at 2,000 and 2,400 Bits per Second," by P. A. Baker, AIEE Transactions, Part 1, No. 61, pages 166–171, July 1962. The particular data set described therein includes a crystal oscillator from which are derived the timing signals mentioned above. Alternatively, timing signals may be provided by the source 100 or by the master control circuitry 105. However, for illustrative purposes, we will consider the data set 120 to be the source of the necessary timing signals.

The transmitting terminal shown in FIG. 1 also includes a reverse channel receiver 125 which comprises a conventional frequency-selective receiver and associated control logic. Illustratively, the receiver 125 is coupled to a reverse channel transmitter 225 (FIG. 2) by the same channel 150 over which encoded information signals are transmitted to a receiving terminal. Advantageously, the reverse channel equipment operates over a narrow frequency range centered at a frequency well below those used for forward transmission of information, check, dummy and control signals. Consequently, the data set and reverse channel frequencies can be transmitted simultaneously over the channel 150 without interference therebetween.

Normally, information, check and dummy digits are applied from the transmitting terminal shown in FIG. 1 to the channel 150 at a rate of 2400 digits per second. Since $\frac{4}{16}$ of these applied signals are representative of information digits, it is apparent that information digits are transmitted normally at an effective rate of 600 digits per second, which is identical to the rate at which information signals are applied from the source 100 to the buffer register 102. Hence, during normal error-free operation of the depicted system there is no accumulation of information sequences in the buffer register 102 beyond those purposely retained therein for possible retransmission. Typically, five information sequences are normally stored in the register 102 for retransmission purposes.

Figure 3A:
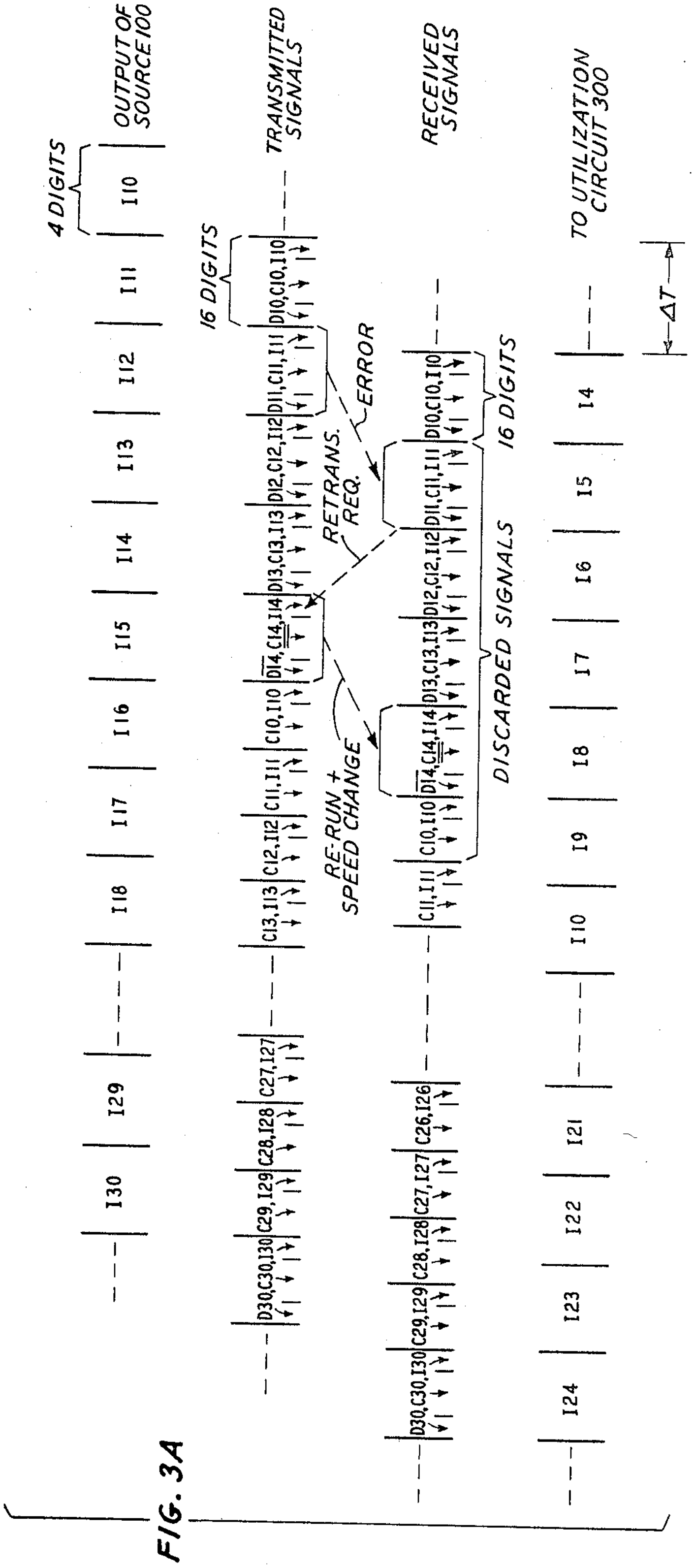
FIGS. 3A and 3B are time-sequence diagrams which are helpful in understanding the over-all operation of the system depicted in FIGS. 1 and 2.
Figure 3B:
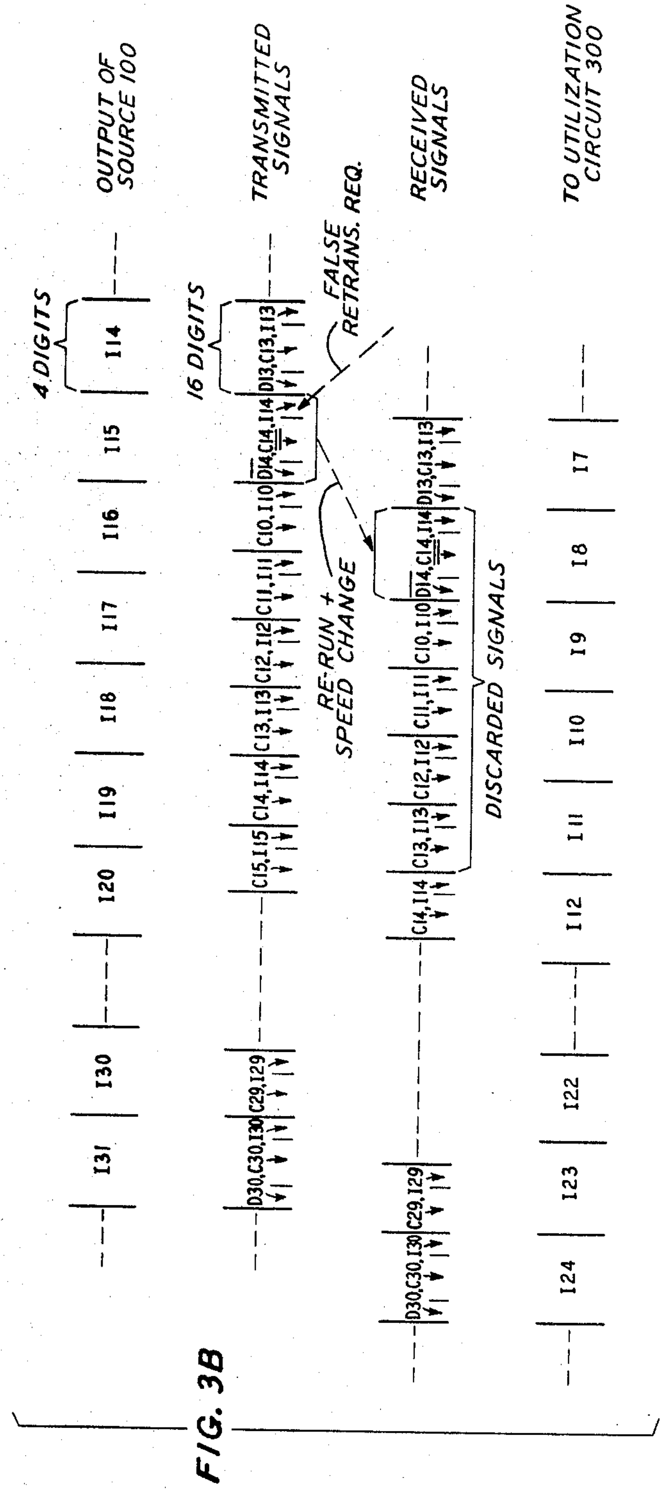

After a retransmission request signal is received by the reverse channel unit 125 shown in FIG. 1, the transmitting terminal is controlled to apply information signals to the channel 150 at an effective rate which exceeds 600 digits per second. This is accomplished by eliminating the dummy digits during the retransmission interval and for a predetermined interval thereafter. In other words, only information and check signals are applied to the channel 150 during these intervals. Thus, the effective information signal rate is raised to $\frac{4}{12}$ of 2400 or 800 digits per second during such intervals. During the actual retransmission interval the buffer register 102 accumulates digits at a rate of 600 per second. However, during the subsequent interval in which dummy digits are still eliminated from the sequences applied to the channel 150, the register 102 returns to its normal state at a rate of 200 digits per second. These relationships will be more apparent when the diagrams of FIGS. 3A and 3B are considered in detail hereinbelow.

In accordance with the principles of the present invention each retransmission request signal supplied to the reverse channel receiver 125 causes a control signal to be applied via lead 126 to the master control circuitry 105. In response thereto the circuitry 105 applies an energizing signal to the re-run indication word generator 115 to cause the generator 115 to sequentially apply the $n-k$ digits of a modifier word to the EXCLUSIVE-OR circuit 112 in time coincidence with the passage through the circuit 112 of the $n-k$ parity check digits of an encoded information word. In this way the parity check digits of a particular redundant information sequence are selectively altered to embody signaling information.

More specifically, assume that during the time in which the four information digit signals of a particular illustrative sequence are being applied to the EXCLUSIVE-OR circuit 112, a retransmission request signal is received by the reverse channel unit 125. In response to this signal the re-run indication word generator 115 is subsequently activated to apply modifying signals to the circuit 112 to alter the nature of the eight parity check digits associated with the particular sequence.

Figure 2:
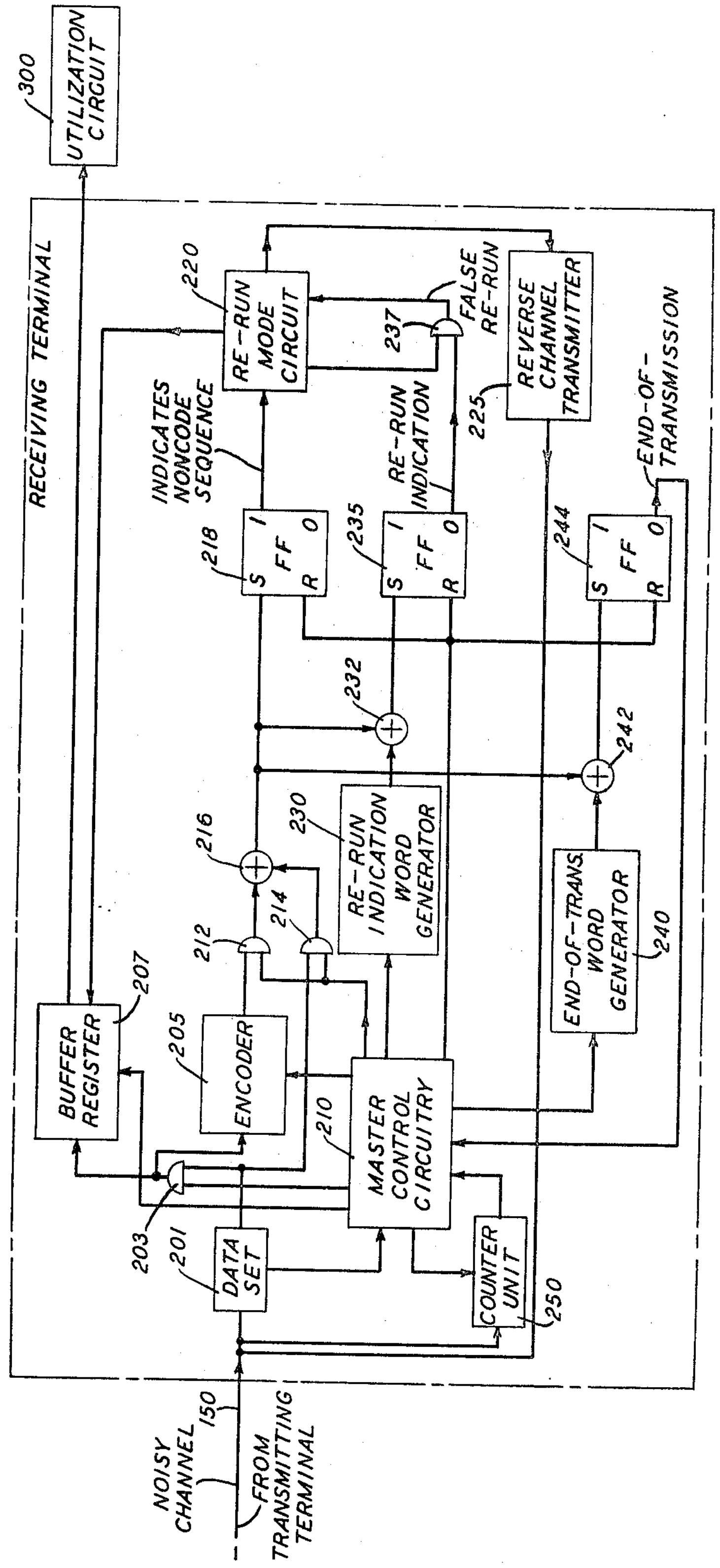

The word generated by the re-run indication unit 115 is derived from a member of the same (15, 7) code set whose truncated version is described herein as being embodied in the illustrative system shown in FIGS. 1 and 2. In particular, one of the sequences of the (15, 7) code that includes a single "1" digit in its information section is selected. Specifically, the selected sequence includes a single "1" signal in the three information digits that are discarded to form a truncated (12, 4) code word, whereby the remaining information section is an all-zero 4-digit sequence. For example, consider the word 000101110000001 (1)

which is a member of the noted (15, 7) code set. The right-hand seven digits of sequence (1) are information digits and the remainder comprise parity check digits. If the right-most three information digits are deleted, the resulting sequence includes an all-zero information section and a non-zero 8-digit parity check section appended thereto. The resulting sequence, that is, 000101110000 (2)

is characterized by a distance of at least 4 from all members of the truncated (12, 4) code set. As noted earlier, the members of the (12, 4) code exhibit at least distance 5 from each other.

Thus, sequence (2) set forth above, is an illustrative modifier word which may be applied from the word generator 115 of FIG. 1 to the EXCLUSIVE-OR circuit 112 to alter an encoded information word. Hence, if the particular redundant information sequence 011101100101 (3)

is the one to be modified during its passage through the circuit 112, the resulting output of the circuit 112 may be found by digit-by-digit modulo 2 addition of (2) and (3). Clearly the all-zero information section of (2) does not result in alteration of the four rightmost or information digits of (3). However, the partity check digit section of (3) is changed so that the modified word applied to the data set 120 is 011000010101 (4)

In a similar manner the master control circuitry 105 shown in FIG. 1 responds to an end-of-information control signal from the source 100 to subsequently trigger the end-of-transmission word generator 118 to selectively modify the parity check digit section of a sequence that is applied from the switch 110 to the EXCLUSIVE-OR circuit 112. The modifier word generated by the unit 118 is also derived from a member of the aforementioned (15, 7) code. For example, consider the 15-digit member 001011100000010 (5)

If the right-most three information digits are deleted from sequence (5), the resulting sequence includes an all-zero information portion and a non-zero 8-digit parity check section. The resulting 12-digit sequence, that is, 001011100000 (6)

is characterized by a distance of at least 4 from all members of the truncated (12, 4) code set and by a distance of at least 3 from the previously mentioned re-run indication modifier word (2). Application of sequence (6) to the circuit 112 results in alteration of only the parity check digit section of a 12-digit word, thereby to form a modified word which has unique signaling information embodied therein.

More generally, the principles of the present invention are directed at selecting non-code words for signaling purposes. These non-code words need not necessarily be associated with a shortened or truncated code. Thus, for example, even if an unshortened code, such as the aforementioned (15, 7) one, is embodied in an error control system, signaling is accomplished by utilizing a set of non-code elements. (Such a set of non-code words is known as a coset.) In particular, a coset is selected which has good distance properties relative to all code words. Advantageously, the selected coset contains the same number of words as the code set. Additionally, a one-to-one correspondence between sequences of the coset and code words is established. Then when a forward signal is to be sent, the unique coset sequence corresponding to the particular code word that would have normally been sent is transmitted instead.

It is noted that in a copending application of L. P. McRae, R. N. Watts and W. J. Wolf, Jr., Ser. No. 356,528, filed Apr. 1, 1964, there is described an error detection and retransmission system which is generally analogous to the system described herein but without the unique signaling capabilities characteristic of a system made in accordance with the principles of the present invention. In the McRae et al. system each digit of a generated parity sequence is inverted before being applied to a transmission channel, whereby the system is able to detect the occurrence of an out-of-synchronism sequence in a highly reliable manner, without affecting the capability of the system to detect the presence of mutilated digits during periods of in-synchronism operation.

Advantageously, the inversion technique of the cited McRae et al. application may be embodied in the specific illustrative system depicted in FIGS. 1 and 2 of this application. Illustratively, this may be accomplished by suitable inverting circuitry included in the encoder 107. Alternatively, the inversion of the parity check digits may be carried out by a word generator (not shown) that is controlled by the master circuitry 105 to apply "1's" or inverting signals to the EXCLUSIVE-OR circuit 112 in time coincidence with the application from the encoder 107 to the circuit 112 of parity check digits.

Before proceeding to a detailed description of the over-all mode of operation of the illustrative system disclosed herein, let us consider the arrangement of the receiving terminal shown in FIG. 2. The illustrative terminal shown in FIG. 2 includes a data set 201 which also may be of the type described in the aforecited Baker et al. article. Signals received from the noisy channel 150 are applied to the set 201 wherein they are demodulated and then applied via a controlled gate 203 to an encoder 205 and a buffer register 207. Under the control of signals applied from master circuitry 210, the gate 203 maintains a closed or complete path between the set 201 and the encoder 205 and register 207 for a first predetermined interval of time that is sufficient for the $k$ information signals of a received redundant sequence to be applied to the units 205 and 207. Subsequently the gate 203 is deactivated and, during a second predetermined interval of time, gates 212 and 214 are enabled or activated.

In the encoder 205 a set of parity check digits is recalculated from the received information signals in accordance with exactly the same relationships by which parity signals were originally generated in the encoder 107 included in the transmitting terminal shown in FIG. 1. Hence, if no errors occurred in the redundant information sequence during transmission over the noisy channel 150, the parity digits recalculated by the encoder 205 are identical to those generated in the unit 107. The recalculated parity digits and the received parity digits are respectively gated through the units 212 and 214 during the aforementioned second time interval. In turn, these two sets of digits are compared in a digit-by-digit manner by an EXCLUSIVE-OR circuit 216.

If the two sets of parity check digits compared by the EXCLUSIVE-OR circuit 216 are determined to be identical, no "1" signals are supplied by the circuit 216 to a normally reset flip-flop 218, whereby no signal indicative of a non-code sequence having been received is applied to a re-run mode circuit 220. In response to this condition the circuit 220 signals the buffer register 207 that the $k$-digit information sequence just previously delivered thereto is a legitimate member of the code set utilized in the illustrative system. In addition, under these circumstances, the reverse channel transmitter 225 is not triggered by the circuit 220 to send a retransmission request via the channel 150 to the transmitting terminal of FIG. 1.

On the other hand, if the two noted sets of parity check signals compared by the EXCLUSIVE-OR circuit 216 are not identical, the circuit 216 generates at least "1" signal to switch the flip-flop 218 to its set state, whereby the circuit 220 is thereby notified that a non-code sequence has been received by the terminal. In response thereto the circuit 220 signals the register 207 that the information sequence just previously supplied thereto is incorrect. Also, in this case the reverse channel transmitter 225 is triggered by the circuit 220 to send a retransmission request signal to the transmitting terminal.

Information sequences applied to the buffer register 207 and designated by the re-run mode circuit 220 as being correct, are initially retained in the register 207 until a prescribed number of such sequences has accumulated. The the sequences are applied from the register 207 to the utilization circuit 300 at a constant rate $R_S$ which, illustratively, is considered herein to be 600 bits per second. Typically, six such sequences are initially stored in the register 207.

The determination of whether or not a received sequence was selectively altered in the transmitting terminal to embody re-run signaling information is carried out in the receiving terminal of FIG. 2 by a re-run indication word generator 230 and an EXCLUSIVE-OR circuit 232. In the circuit 232 the output of the EXCLUSIVE-OR circuit 216 is compared on a digit-by-digit basis with the output of the word generator 230. In the specific example assumed herein the unit 230 is arranged to generate the word $$00010111 \qquad (7)$$

If the two sets of digits applied to the circuit 232 are identical, an associated flip-flop 235 is permitted to remain in its normally reset state, whereby a re-run indication signal is applied from the flip-flop 235 via a gate 237 to the re-run mode circuit 220. If, on the other hand, the two sets of digits applied to the circuit 232 are not identical, the flip-flop 235 is as a result switched to its set condition and no re-run indication signal is applied to the gate 237.

The gate 237 is disabled or enabled by the re-run mode circuit 220 depending respectively on whether or not a non-code sequence (an erroneous word) had just previously been received by the terminal of FIG. 2. If an erroneous word was just previously received (more specifically, received within the last four words) the gate 237 is disabled and no signal is applied from the unit 237 to the circuit 220. On the other hand, if no erroneous word was previously received, the gate 237 is enabled and a signal indicative of a false re-run occurrence is applied to the circuit 220. In turn, as described below, whether or not the circuit 220 receives a false re-run signal from the gate 237 determines the manner in which the circuit 220 controls the operation of the buffer register 207.

An example will serve to illustrate the manner in which re-run signaling information is detected. Assume that the code sequence (3) is applied to the EXCLUSIVE-OR circuit 112 shown in FIG. 1 and that in digit-by-digit coincidence therewith the modifier word (2) is also applied to the circuit 112. The resulting modified sequence to be transmitted is represented by (4). If no errors occur during transmission, the right-hand four digits of (4) are applied to the encoder 205 of FIG. 2 wherein a set of parity check digits therefor is recalculated. This set will comprise the 8-digit sequence $$01110110 \qquad (8)$$

In the EXCLUSIVE-OR circuit 216 sequence (8) is compared in a digit-by-digit manner with the received 8-digit parity sequence $$01100001 \qquad (9)$$

Therefore, the output of the circuit 216 is $$00010111 \qquad (10)$$

The first "1" signal of sequence (10) sets the flip-flop 218 to the condition wherein it indicates to the circuit 220 the receipt of a non-code word. In addition, sequence (10) is applied to the EXCLUSIVE-OR circuit 232 wherein a digit-by-digit comparison between it and the output (7) of the word generator 230 is carried out. The sequences (7) and (10) are seen to be identical. Accordingly, modulo 2 addition thereof gives an all-zero word which is not effective to set the flip-flop 235. Thus, the flip-flop 235 remains in its re-set state, thereby to indicate that the terminal of FIG. 2 has received a re-run indication signal. Furthermore, whether the re-run is the result of a bona fide or false retransmission request is indicated by the nature of the output condition of the gate 237.

The determination of whether or not a received sequence was selectively altered in the transmitting terminal to embody end-of-transmission information is carried out in the receiving terminal of FIG. 2 in a manner that is closely analogous to that described above for re-run indication signals. In particular, the determination is carried out by an end-of-transmission word generator 240 and an EXCLUSIVE-OR circuit 242. In the circuit 242 the output of the EXCLUSIVE-OR circuit 216 is compared on a digit-by-digit basis with the output of the word generator 240. In the particular example considered herein, the unit 240 is arranged to generate the word $$00101110 \qquad (11)$$

If the two sets of digits applied to the circuit 242 are identical, a flip-flop 244 is permitted to remain in its normally reset condition, whereby an end-of-transmission indication signal is communicated to the master control circuitry 210. If, on the other hand, the two sets of digits applied to the circuit 242 are not identical, the flip-flop 244 is switched to its set state and no end-of-transmission signal is applied to the circuitry 210.

For a more complete understanding of the principles of the present invention, let us consider in more detail the over-all operation of the specific illustrative system shown in FIGS. 1 and 2. Initial activation of the system results from the application from the source 100 to the master circuitry 105 of a so-called request-to-send control signal (depicted in the bottom graph of FIG. 4). In response to such a signal there ensues an automatic synchronization procedure of the type described in the aforecited McRae et al. application. Assume that synchronization between the herein-considered transmitting and receiving terminals has been achieved. Furthermore, assume that during a period of error-free operation each of a sequence of 4-digit information words supplied by the source 100 has been encoded and applied to the channel 150, as described above. The upper-most row of FIG. 3A represents from right to left the sequence of information words emitted by the source 100. The first 4-digit word indication shown there is designated I10 which, as mentioned above, is assumed to be supplied at a rate $R_S$ or 600 bits per second. After encoding, I10 has appended thereto eight parity check digits identified as C10. Then four dummy digits designated D10 are added to C10. This 16-digit sequence is represented in the second row of FIG. 3A and constitutes the rebundant word actually applied to the channel 150.

It is characteristic of the system shown in FIGS. 1 and 2 that there is a determinable delay between the transmission of a particular digital signal and its receipt by the receiving terminal. Thus, the redundant word which includes I10, C10 and D10 is indicated in the third row of FIG. 3A as being received (error-free) by the terminal of FIG. 2 after a time delay represented as ΔT. As indicated in FIG. 3A, the next transmitted 16-digit sequence, that is, the one that includes I11, is assumed to be mutilated or distorted during its transit between the transmitting and receiving terminals. The erroneous nature of this sequence is detected by the equipment included in FIG. 2, whereby the re-run mode circuit 220 is activated to signal the buffer register 207 to discard I11 and the four information sequences received immediately following I11, as represented in FIG. 3A. In addition, the circuit 220 triggers the reverse channel transmitter 225 to send a retransmission request signal to the transmitting terminal of FIG. 1.

Assume that the retransmission request signal is received at the transmitting terminal during the time in which the information digit portion of I14–C14–D14 is being applied to the EXCLUSIVE-OR circuit 112 shown in FIG. 1. In response to this retransmission request signal the master control circuitry 105 energizes the re-run indication word generator 115 in time coincidence with the subsequent application to the circuit 112 of the digits that comprise C14. Two horizontal lines have been drawn under the designation C14 in the second row of FIG. 3A to indicate that the constituent digits thereof are selectively altered in accordance with the inventive principles described herein. Moreover, the circuitry 105 subsequently applies *m* (in the specific case considered herein *m* equals 4) "1" signals to the EXCLUSIVE-OR circuit 128 in time coincidence with the passage therethrough of the dummy digits that comprise D14. As a result, the dummy digits, which are normally "O" signals, are inverted to "1" signals. This inversion is represented in FIG. 3A by a horizontal line over D14.

In the receiving terminal shown in FIG. 2 the modified version of C14 is interpreted as a re-run indication signal, in the specific manner described above. Also, since a previous error occurrence had just been detected by the terminal in connection with its processing of I11, the gate 237 is disabled and the circuit 220 is thereby signaled that the re-run is a bona fide one caused by a previously-received erroneous information sequence. In addition, the "1" dummy signals included in I14–C14–D14 are counted by a counter unit 250 included in the receiving terminal. If the unit 250 registers a count of 3 or more in response to the application thereto of the signals that comprise D14, the master control circuitry 210 is signaled that a change in the speed of operation of the receiving equipment must take place. This speed change is effected by the circuitry 210 to take into account the fact that subsequently-received sequences will include only information and parity check digits with no dummy digits appended thereto. In the specific example considered herein the subsequent 20 received sequences are dummy-free.

In response to the retransmission request signal indicated in FIG. 3A, the transmitting terminal of FIG. 1 retransmits from the information stored in the buffer register 102 the four redundant sequences previously sent before the receipt of the retransmission request. I14 and C14 are also retransmitted. Then subsequent words which have accumulated in the register 102 during the retransmission period are encoded and sent in order. Finally, after a total of 20 dummy-free 12-digit redundant words have been transmitted (including the five retransmitted ones) the transmitting terminal automatically reverts to the mode of operation in which dummy digits are appended to each encoded information word. This is represented in FIG. 3A by the indication that I30 and C30 include a dummy sequence D30 added thereto.

It is noted that the addition or not of dummy digits to each redundant information sequence is determined by the manner in which the switch 110 is controlled by the master circuitry 105 of FIG. 1. Thus, during normal operation the arm of the switch 110 is moved to contact positions I, II and III in that order, whereas during dummy-free operation only positions I and II are contacted in repetitive sequence.

During the time in which five received sequences are being discarded by the receiving terminal of FIG. 2, information sequences continue to be applied to the utilization circuit 300 from the buffer register 207. These applied sequences are ones that had previously accumulated in the register 207. After the retransmission interval the register 207 again builds up its store of accumulated sequences, so that at the time when the dummy-free mode of operation ceases there is again a normal backlog of six information sequences stored therein.

Also, the buffer register 102 included in the transmitting terminal empties during the dummy-free mode of operation, so that at the conclusion thereof there are only five information sequences stored therein for retransmission purposes.

Now let us consider the mode of operation of the system shown in FIGS. 1 and 2 in response to a false retransmission request signal. As mentioned above, such a false signal can result from an error occurrence on the reverse signaling channel. FIG. 3B is representative of the false retransmission request case. As indicated in FIG. 3B a false retransmission request signal is assumed to be received at the transmitting terminal during the time in which I14 is passing through the EXCLUSIVE-OR circuit 112. In response to this retransmission request signal and in exactly the same manner described above in connection with a bona fide retransmission request, the re-run indication word generator 115 is conditioned by the master control circuitry 105 to selectively alter the digits of C14 as they are passed through the circuit 112. Furthermore, the dummy digits comprising the subsequence D14 are each converted to "1" signals in response to appropriate control signals applied from the circuitry 105 to the EXCLUSIVE-OR circuit 128.

The modified I14–C14–D14 sequence represented in FIG. 3B is applied to the channel 150 and subsequently received by the terminal shown in FIG. 2. In response to this received sequence the EXCLUSIVE-OR circuit 216 of FIG. 2 provides at its output an $n-k$ word which, when combined in the EXCLUSIVE-OR circuit 232 with the output of the re-run indication word generator 230, allows the flip-flop 235 to remain in its reset condition. As described in detail above, this is indicative of a re-run indication having been processed by the receiving terminal. And since the re-run mode circuit 220 had not just previously been signaled of the occurrence of an error, the circuit 220 provides an enabling signal to the gate 237, whereby the re-run indication signal applied to the unit 237 is passed therethrough to provide to the circuit 220 a signal indicative of a false re-run.

In response to the false re-run situation described above, the buffer register 207 of FIG. 2 is controlled by the circuit 220 to discard the aforenoted I14–C14–D14 sequence and the immediately-following four additional sequences. It is noted that each of these four following sequences is a dummy-free retransmitted word.

Subsequently, after a total of 20 dummy-free 12-digit redundant words have been transmitted (including the five retransmitted ones) the transmitting terminal automatically reverts to the mode of operation in which dummy digits are again appended to each encoded information word. This is represented in FIG. 3B by the indication that I30 and C30 include a dummy sequence D30 added thereto.

During the false re-run condition described herein and represented by FIG. 3B, information signals continue to be applied at a steady rate from the buffer register 207 of FIG. 2 to the utilization circuit 300 in the same manner that is characteristic of the true or bona fide re-run case detailed earlier. Similarly, in the false re-run situation, the source 100 of FIG. 1 continually applies information signals at a steady rate to the buffer register 102 before, during and after the false re-run mode of operation.

Figure 4:
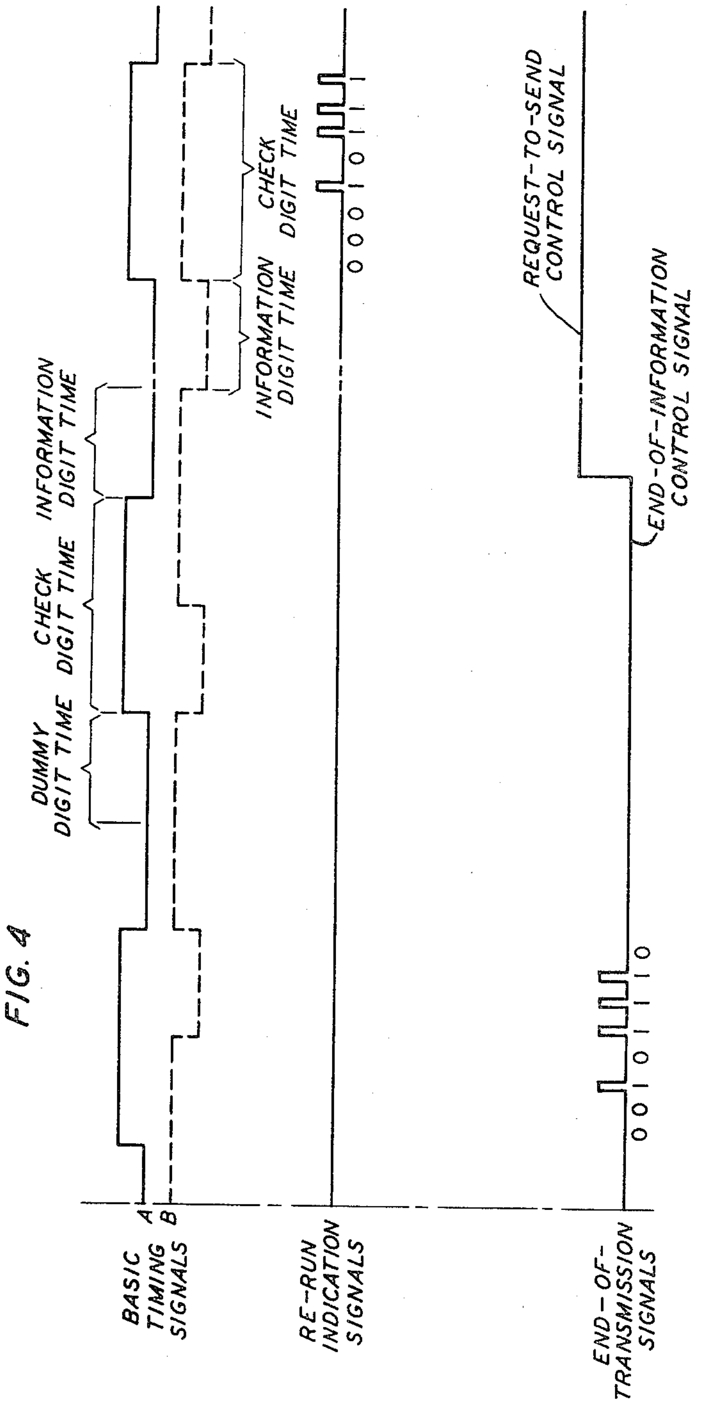
FIG. 4 illustrates the nature of various signals utilized in the system of FIGS. 1 and 2.

FIG. 4 illustrates some of the timing relationships discussed herein. The top waveform designated A represents the basic timing signals supplied by the master control circuitry 105 during those periods in which dummy digits are appended to each redundant sequence. The waveform designated B represents the basic timing signals supplied by the circuitry 105 during dummy-free operation.

The specific illustrative re-run indication signals shown in FIG. 4 represent the parity check digit portion of sequence (2). These signals, which are generated by the re-run indication word unit 115 of FIG. 1, are seen to occur during the so-called check digit time of the basic timing signals A and B.

As described above, the source 100 shown in FIG. 1 initiates an over-all cycle of operation by applying a request-to-send control signal to the master circuitry 105. This signal, represented as a relatively positive one, is shown as part of the bottom waveform of FIG. 4.

Finally, after all information sequences to be transmitted have left the source 100, the source applies an end-of-information control signal, illustratively a relatively negative indication, to the circuitry 105. After receipt of this control signal, the circuitry 105 waits a predetermined interval of time, determined in part by the time required to empty the buffer register 102, and then activates the end-of-transmission word generator 118 to apply the specific illustrative 8-digit signaling sequence shown in FIG. 4 to the EXCLUSIVE-OR circuit 112. The receipt of this signaling sequence by the receiving terminal of FIG. 2 causes the flip-flop 244 to apply an end-of-transmission signal to the master control circuitry 210, as described above. In turn, the circuitry 210 responds thereto by conditioning the receiving terminal for another complete cycle of operation which can subsequently be initiated by another request-to-send control signal from the source 100. In particular, the noted conditioning of the receiving terminal includes the resetting of the flip-flops 218, 235 and 244 and the emptying of the buffer register 207.

Thus there has been described herein a specific exemplary error control system which illustratively embodies the principles of the present invention. In the system, signaling information is sent in a manner that does not restrict in any way the code elements that may be supplied by the source 100 to represent information sequences. Additionally, transmitted sequences which embody signaling information in accordance with the techniques of this invention are highly unlikely to be transformed by errors into actual code words. This is so because of the good distance properties of the signaling sequences with respect to all sequences of the code set utilized for information transmission.

It is noted that the buffer registers 102 and 207 included in the illustrative system described herein may advantageously be implemented in the specific manner disclosed in Patent 3,421,147 issued to H. O. Burton, L. P. McRae and W. J. Wolf, Jr., Jan. 7, 1969.

Suitable implementations of the source 100, the word generators 115, 118, 230 and 240, the master control circuitry 105 and 210, the re-run mode circuit 220, as well as of the other various well-known units included in FIGS. 1 and 2, are considered in view of the specific end requirements therefor set forth above to be clearly within the skill of the art and are, accordingly, not set forth in detail herein. The present invention is not limited to or dependent on any particular configuration for these various units. Rather, the invention resides in the particular manner in which these individually well-known units are interconnected in a unique way to form a signaling system.

It is to be understood that although particular attention herein has been directed to a truncated (12, 4) BCH code, other codes not specifically mentioned are well suited for utilization in a signaling system made in accordance with the principles of the present invention. For example, one system embodying the principles of this invention makes use of a (63, 51) BCH code that is truncated by the elimination of three information digits to form a (60, 48) code. In such an alternative system a typical transmitted sequence includes 48 information digits, 12 parity check digits and 20 dummy digits.

Furthermore, it is to be understood that the above-described arrangements are only illustrative of the application of the principles of the present invention. In accordance with these principles numerous other arrangements may be devised by those skilled in the art without departing from the spirit and scope of the invention. For example, although emphasis herein has been directed to applying the principles of this invention to the detection of errors which occur on a transmission channel that interconnects spaced transmitting and receiving terminals, it is clear that these principles are actually applicable to the detection of errors in information-processing equipment, such as a computer, which is positioned at a single location.

What is claimed is:

1. In combination in an error detection and retransmission system, means for supplying information digit sequences, means responsive to each different one of said sequences for appending a parity check digit sequence thereto in accordance with an error detection code to form a redundant information sequence, and means responsive to said redundant sequences for embodying signaling information in one or more but less than all of said redundant sequences by altering only selected ones of only the parity digits thereof.

2. In combination, means for generating a plurality of encoded sequences each of which is a member of an error detection code set and each of which comprises an information digit portion and a parity check digit portion, and means responsive to said sequences for changing only certain digits of only the check digit portion of one or more but less than all of said sequences.

3. In combination in an error detection and retransmission system which utilizes a truncated version of a BCH binary code, a source of information signals, means responsive to said information signals for deriving therefrom a set of parity check signals in accordance with the truncated version of said code, means for appending said parity check signals to said information signals to form a redundant sequence, means for generating a binary modifier word which is derived from a particular member of said BCH code, said word including "0" representations in all digit positions corresponding to information digit positions of said redundant sequence and including at least one "1" representation in digit positions corresponding to parity check digit positions of said redundant sequence, and means responsive to said modifier word and to said redundant sequence for combining them in a digit-by-digit manner to form an altered sequence which embodies signaling information.

4. In combination, means for generating signals representative of encoded binary words each of which comprises a plurality of information digits and a plurality of parity check digits, and means responsive to said signals for selectively modifying only certain ones of only the parity check digits of one or more but less than all of said encoded words to embody signaling information in said modified encoded words.

5. A combination as in claim 4 further including means for applying each word to one end of a transmission medium, means coupled to the other end of said medium and responsive to the information digits of each encoded word for generating a recalculated set of parity check digits, and means for comparing said recalculated set and said received parity digits to determine whether or not the difference therebetween is in exact accordance with said selective modification.

6. In combination, a modifier circuit, means for generating and applying to said circuit a redundant binary sequence which includes representations of information and parity check digits, and word generating means for applying to said circuit a predetermined sequence of "0" and "1" representations in respective time coincidence with the application to said circuit of said parity check digits, whereby said redundant sequence is selectively modified to embody therein signaling information.

7. In combination, an EXCLUSIVE-OR circuit, means for generating and applying to said circuit a plurality of encoded sequences each of which is a member of a BCH error detection code and each of which includes an information digit section and a parity check digit section, a re-run indication word generator connected to said circuit for altering only selected ones of the digits of the parity check digit section of a particular one of said sequences, and an end-of-transmission word generator connected to said circuit for altering only selected ones of the digits of the parity check digit section of a different one of said sequences.

8. A combination as in claim 7 further including master circuitry for controlling the activation of said two word generators, and a reverse channel receiver connected to a transmission channel for applying a trigger signal to said master circuitry to initiate the activation of said re-run indication word generator.

9. A combination as in claim 8 further including a source of information and control signals connected to said master circuitry for applying thereto a control signal to initiate the activation of said end-of-transmission word generator.

10. A combination as in claim 9 still further including a generator for applying dummy digits to said EXCLUSIVE-OR circuit in timed relationship with respect to the information and parity check digit sections of specified encoded sequences, and means controlled by said master circuitry for inverting the dummy digits of each sequence whose parity check digit section is altered by said re-run indication word generator.

11. A combination as in claim 10 still further including means for inhibiting the application of said dummy digits to said EXCLUSIVE-OR circuit for a predetermined interval of time subsequent to the inversion of said digits.

12. In combination in a system which is adapted to transmit digital data information words which are members of an error control code set, each of said words including an information digit section and a parity check digit section, said system including interconnected transmitting and receiving terminals, control signal means in said transmitting terminal for selectively modifying only the check digit section of one or more but less than all of said information words to form a signaling word which is not a member of said code set, and means included in said receiving terminal for detecting whether or not the check digit section of a received information word has been selectively modified by said control signal means.

13. In combination in a terminal for receiving from a channel redundant information sequences each of which has been encoded in accordance with an error detection code, each of said sequences including an information digit section and a parity check digit section, at least some of said sequences each further including a dummy digit section, means responsive to each received information digit section for recalculating a set of parity check digits therefor, means for comparing each such recalculated set with the corresponding received set of parity check digits and for providing a multidigit word representative of the relationship therebetween, means for repeatedly generating a unique re-run indication word, and circuitry responsive to the word provided by said re-run generating means and to said multidigit word for indicating whether or not said multidigit word is identical to said unique re-run word.

14. A combination as in claim 13 further including means for repeatedly generating a unique end-of-transmission word, and additional circuitry responsive to the word provided by said end-of-transmission generating means and to said multidigit word for indicating whether or not said multidigit word is identical to said unique end-of-transmission word.

15. A combination as in claim 14 further including means coupled to said channel for counting the number of "1" dummy digits included in each of said sequences.

16. A combination as in claim 15 still further including means responsive to said multidigit word for supplying a first signal indicative of whether or not the received sequence from which said multidigit word was derived was a member of said error detection code.

17. A combination as in claim 16 still further including means responsive to the indication provided by said first-mentioned circuitry for supplying a second signal indicative of whether or not a re-run indication was embodied in the received sequence.

18. A combination as in claim 17 still further including a buffer register for storing information digit sections applied thereto from said channel, a utilization circuit connected to said buffer register, and still additional circuitry responsive to said first and second signals for determining which ones of the sections stored in said register are to be applied to said utilization circuit.

References Cited

UNITED STATES PATENTS

| | | | |
|---|---|---|---|
| 3,156,767 | 11/1964 | Van Duuren et al. | 340—146.1 X |
| 3,162,837 | 12/1964 | Meggitt | 340—146.1 |
| 3,398,400 | 8/1968 | Rupp et al. | 340—146.1 |

MALCOLM A. MORRISON, Primary Examiner

C. E. ATKINSON, Assistant Examiner

U.S. Cl. X.R.

325—41